(12) United States Patent
Thummaluri et al.

(10) Patent No.: US 12,266,351 B2
(45) Date of Patent: Apr. 1, 2025

(54) ADAPTIVE FRAME SKIPPING FOR SPEECH RECOGNITION

(71) Applicant: QUALCOMM Incorporated, San Diego, CA (US)

(72) Inventors: Uday Reddy Thummaluri, Nalgonda (IN); Sachin Abdagire, Hyderabad (IN); Prapulla Vuppu, Secunderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 320 days.

(21) Appl. No.: 17/822,715

(22) Filed: Aug. 26, 2022

(65) Prior Publication Data

US 2024/0071370 A1 Feb. 29, 2024

(51) Int. Cl.
*G10L 15/04* (2013.01)
*G10L 15/08* (2006.01)
(Continued)

(52) U.S. Cl.
CPC ............ *G10L 15/16* (2013.01); *G10L 15/04* (2013.01); *G10L 15/08* (2013.01); *G10L 25/78* (2013.01); *G10L 2015/088* (2013.01); *G10L 25/30* (2013.01); *G10L 2025/783* (2013.01); *G10L 25/87* (2013.01); *G10L 25/93* (2013.01)

(58) Field of Classification Search
None
See application file for complete search history.

(56) References Cited

U.S. PATENT DOCUMENTS 6,009,391 A * 12/1999 Asghar ............... G10L 15/20
 704/238
6,567,775 B1 * 5/2003 Maali ............... G06V 20/40
 704/231

(Continued)

OTHER PUBLICATIONS

Finke M., et al., "Modeling and Efficient Decoding of Large Vocabulary Conversational Speech", 6th European Conference on Speech Communication and Technology. Eurospeech '99, Budapest, Hungary, Sep. 5-9, 1999, BONN: ESCA, DE, Sep. 5, 1999, pp. 467-470, XP001076145, Abstract Section 3.6.

(Continued)

*Primary Examiner* — Richard Z Zhu
(74) *Attorney, Agent, or Firm* — QUALCOMM Incorporated; Espartaco Diaz Hidalgo

(57) ABSTRACT

Systems and techniques are described herein for processing audio signals. For instance, a process can include receiving a first audio frame associated with a first time frame. The process can further include generating a first time frame feature vector based on the first audio frame. The process can include determining a distance between the first time frame feature vector and a second time frame feature vector. The second time frame feature vector may be generated based on a second audio frame associated with a second time frame, where second time frame is being before the first time frame. The process can further include comparing the distance between the first time frame feature vector and the second time frame feature vector to a threshold distance. The process can include determining whether to skip processing of the first audio frame by an application based on the comparison.

30 Claims, 9 Drawing Sheets

(51) Int. Cl.
  *G10L 15/16* (2006.01)
  *G10L 25/78* (2013.01)
  *G10L 25/30* (2013.01)
  *G10L 25/87* (2013.01)
  *G10L 25/93* (2013.01)

(56) References Cited

U.S. PATENT DOCUMENTS

| | | | | |
|---|---|---|---|---|
| 7,769,580 | B2 * | 8/2010 | Gemello | G10L 15/16 |
| | | | | 704/231 |
| 7,778,839 | B2 * | 8/2010 | Metz | G10L 19/167 |
| | | | | 704/201 |
| 10,482,879 | B2 | 11/2019 | Tang | |
| 11,205,420 | B1 * | 12/2021 | Fu | G06N 3/04 |
| 11,348,572 | B2 * | 5/2022 | Song | G06N 3/084 |
| 2006/0111897 | A1 * | 5/2006 | Gemello | G10L 15/16 |
| | | | | 704/E15.017 |
| 2020/0349925 | A1 | 11/2020 | Shahid et al. | |

OTHER PUBLICATIONS

International Search Report and Written Opinion—PCT/US2023/069830—ISA/EPO—Oct. 5, 2023.

Song I., et al., "Dynamic Frame Skipping for Fast Speech Recognition in Recurrent Neural Network Based Acoustic Models", 2018 IEEE International Conference on Acoustics, Speech and Signal Processing (ICASSP), Apr. 15, 2018, pp. 4984-4988, XP033401879, DOI: 10.1109/ICASSP.2018.8462615, Abstract, Section 5.

Xi Y., et al., "Text Adaptive Detection for Customizable Keyword Spotting", ICASSP 2022—2022 IEEE International Conference on Acoustics, Speech and Signal Processing (ICASSP), May 23, 2022, pp. 6652-6656, XP034158090, DOI: 10.1109/ICASSP43922.2022.9746647, Abstract p. 6655, Left-hand Column Line 2—Line 3.

* cited by examiner

ADAPTIVE FRAME SKIPPING FOR SPEECH RECOGNITION

FIELD

This application is related to speech recognition. For example, systems and techniques are described for performing adaptive frame skipping for speech recognition.

BACKGROUND

Electronic devices such as smartphones, tablet computers, wearable electronic devices, smart TVs, and the like are becoming increasingly popular among consumers. These devices can provide voice and/or data communication functionalities over wireless or wired networks. In addition, such electronic devices can include other features that provide a variety of functions designed to enhance user convenience. Electronic devices can include a speech recognition function for receiving voice commands from a user. Such a function allows an electronic device to perform a function associated with a voice command (e.g., such as via a keyword) when the voice command from a user is received and recognized. For example, the electronic device may activate a voice assistant application, play an audio file, or take a picture in response to the voice command from the user.

Speech recognition can be implemented as an "always-on" function in electronic devices in order to maximize its utility. This always-on functions require always-on software and/or hardware resources, which in-turn lead to always-on power usage. Mobile electronic devices, internet of things (IoT) devices, and the like are particularly sensitive to such always-on power demands as they reduce battery life and consume other finite resources of the system, such as processing capacity.

SUMMARY

Systems and techniques are described herein for processing audio signals. According to some aspects, the systems and techniques include performing adaptive frame skipping for speech recognition (e.g., feature vector-based speech recognition). In some devices, an always-on speech recognition engine may receive audio frames, generate feature vectors based on characteristics of the received audio frames, and utilize a neural network model (or other machine learning model) to process the feature vectors to predict (e.g., recognize) whether a command has been received. In some cases, processing of the feature vectors by the neural network may be skipped based on a comparison between a current feature vector and a previous feature vector. Skipping the processing of feature vectors helps save an amount of energy that would otherwise be used to process the feature vector.

In one illustrative example, an apparatus for processing audio signals is provided. The apparatus includes at least one memory and at least one processor coupled to the at least one memory. The at least one processor is configured to: receive a first audio frame associated with a first time frame; generate a first time frame feature vector based on the first audio frame; determine a distance between the first time frame feature vector and a second time frame feature vector, the second time frame feature vector generated based on a second audio frame associated with a second time frame; the second time frame being before the first time frame; compare the distance between the first time frame feature vector and the second time frame feature vector to a threshold distance; and determine whether to skip processing of the first audio frame by an application based on the comparison.

In another example, a method for processing audio signals is provided. The method includes: receiving a first audio frame associated with a first time frame; generating a first time frame feature vector based on the first audio frame; determining a distance between the first time frame feature vector and a second time frame feature vector, the second time frame feature vector generated based on a second audio frame associated with a second time frame; comparing the distance between the first time frame feature vector and the second time frame feature vector to a threshold distance; and determining whether to skip processing of the first audio frame by an application based on the comparison.

As another example, a non-transitory computer-readable medium is provided that has stored thereon instructions that, when executed by one or more processors, cause the at one or more processors to: receive a first audio frame associated with a first time frame; generate a first time frame feature vector based on the first audio frame; determine a distance between the first time frame feature vector and a second time frame feature vector, the second time frame feature vector generated based on a second audio frame associated with a second time frame; compare the distance between the first time frame feature vector and the second time frame feature vector to a threshold distance; and determine whether to skip processing of the first audio frame by an application based on the comparison.

In another example, an apparatus for processing audio signals is provided. The apparatus includes: means for receiving a first audio frame associated with a first time frame; means for generating a first time frame feature vector based on the first audio frame; means for determining a distance between the first time frame feature vector and a second time frame feature vector, the second time frame feature vector generated based on a second audio frame associated with a second time frame; means for comparing the distance between the first time frame feature vector and the second time frame feature vector to a threshold distance; and means for determining whether to skip processing of the first audio frame by an application based on the comparison.

In some aspects, one or more of the apparatuses described herein is, is part of, and/or includes an extended reality (XR) device or system (e.g., a virtual reality (VR) device, an augmented reality (AR) device, or a mixed reality (MR) device), a mobile device (e.g., a mobile telephone or other mobile device), a wearable device, a wireless communication device, a camera, a personal computer, a laptop computer, a vehicle or a computing device or component of a vehicle, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor.

The above-described aspects relating to any of the methods, apparatuses, and computer-readable media can be used individually or in any suitable combination.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Examples of various implementations are described in detail below with reference to the following figures.

DETAILED DESCRIPTION

Figure 1:
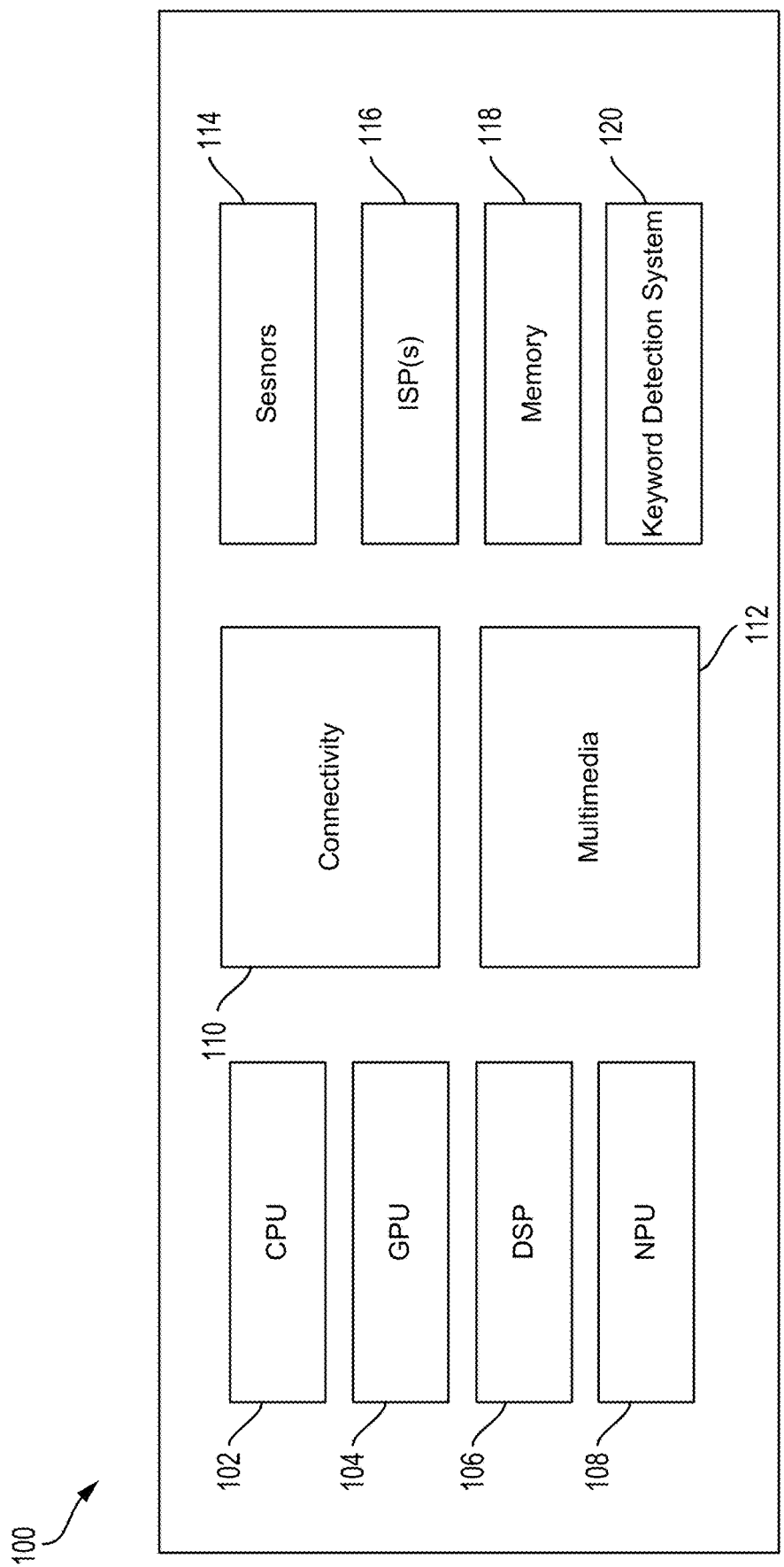
FIG. 1 is a block diagram illustrating an example speech recognition system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Voice recognition generally refers to the discrimination of a human voice by an electronic device in order to perform some function. One type of voice recognition may include keyword detection (e.g., wake word detection). Keyword detection may refer to a technique where a device detects and responds to certain words. For example, many consumer electronic devices may use keyword detection to recognize specific key words to perform certain actions, such as to "wake" a device, to query a device, and/or to cause the device to perform various other functions. Voice recognition can also be used in more complex functionalities, such as "far field" voice recognition (e.g., from a mobile device placed across a room), user identify verification (e.g., by voice signature), voice recognition during other audio output (e.g., detecting a voice command while playing back music on a device or detecting an interrupting command while a smart assistant is speaking), and voice interaction in complex noise environments, such as within moving vehicles. These are just a few examples, and many others are possible.

Voice recognition, like various other processing tasks on electronic devices, requires power and dedicated hardware and/or software to function. Further, voice recognition may be implemented as an "always-on" function (e.g., where audio is continuously monitored for key word detection) to maximize its utility to users of electronic devices with voice recognition functionality. For devices that are plugged in, the power usage of always-on voice recognition functionality is primarily an efficiency consideration, but for power sensitive devices (e.g., mobile electronic devices, IoT devices, and the like) with always-on voice recognition functionality, power usage may be of more concern. For example, power use from always-on functions can limit the run-time of such devices and reduce capacity for other system processing requirements.

Systems and techniques are described herein for providing a keyword detection system that can dynamically skip audio frames of an audio signal. Examples of audio signals include speech or voice signals, music signals, and/or other sound signals. In some cases, both software-based and hardware-based keyword detection systems may use multiple processing steps along with machine learning models for detecting and recognizing voices. For example, both software-based and hardware-based keyword detection systems may use a feature detection step along with machine-learning based steps. The feature detection step may receive, as input, an audio frame, and generate a feature vector based on the audio frame. This feature vector may be input to the machine-learning based step, for example, for analysis by a machine learning model, such as a machine learning classifier. Generally, the machine-learning based steps are more complex than the feature detection steps. For example, the machine-learning based steps may use complex and power-hungry processing hardware, such as specialized digital signal processors (DSPs), machine learning accelerators, artificial intelligence processing cores, and the like.

In some cases, to reduce the use of the machine learning based steps for keyword detection systems while maintaining reliable keyword detection, a current audio frame may be compared to a previous audio frame. For example, a first feature vector used for feature detection in the current audio frame may be compared to a second feature vector used for feature detection in the previous audio frame. If the current audio frame (e.g., the first feature vector) is within a threshold distance from the previous audio frame (e.g., the second feature vector), or if a frame score from two previous audio frames is decreasing over time, then processing of the current audio frame by the machine learning based steps may be skipped. Skipping the machine learning based steps may be useful for reducing an amount of power used for keyword detection systems.

Various aspects of the present disclosure will be described with respect to the figures. FIG. 1 illustrates an example implementation of a system-on-a-chip (SoC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures, speech, and/or other interactive user action(s) or input(s). In one implementation, the NPU 108 is implemented in the CPU 102, DSP 106, and/or GPU 104. The SoC 100 may also include a sensor processor 114, image signal processors (ISPs) 116, and/or a keyword detection system 120. In some examples, the sensor processor 114 can be associated with or connected to one or more sensors for providing sensor input(s) to sensor processor 114. For example, the one or more sensors and the sensor processor 114 can be provided in, coupled to, or otherwise associated with a same computing device.

In some examples, the one or more sensors can include one or more microphones for receiving sound (e.g., an audio input), including sound or audio inputs that can be used to perform keyword spotting (KWS), which may be considered a specific type of keyword detection. In some cases, the sound or audio input received by the one or more microphones (and/or other sensors) may be digitized into data packets for analysis and/or transmission. The audio input may include ambient sounds in the vicinity of a computing device associated with the SoC 100 and/or may include speech from a user of the computing device associated with the SoC 100. In some cases, a computing device associated with the SoC 100 can additionally, or alternatively, be communicatively coupled to one or more peripheral devices (not shown) and/or configured to communicate with one or more remote computing devices or external resources, for example using a wireless transceiver and a communication network, such as a cellular communication network.

SoC 100, DSP 106, NPU 108 and/or keyword detection system 120 may be configured to perform audio signal processing. For example, the keyword detection system 120 may be configured to perform steps for KWS. As another example, one or more portions of the steps, such as feature generation, for voice KWS may be performed by the keyword detection system 120 while the DSP 106/NPU 108 performs other steps, such as steps using one or more machine learning networks and/or machine learning techniques according to aspects of the present disclosure and as described herein.

Figure 2:
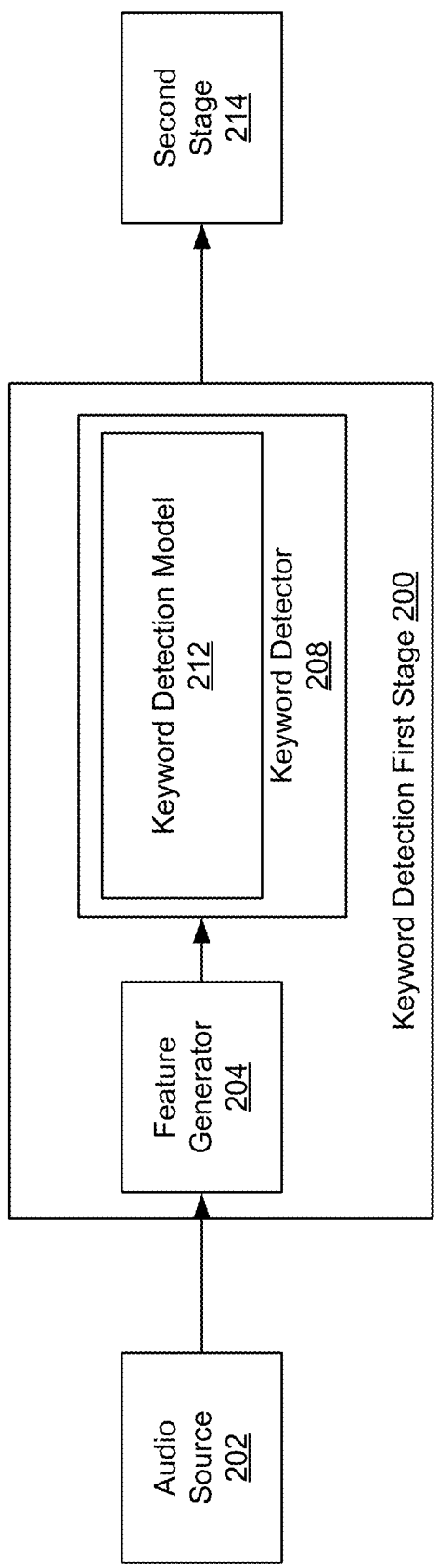
FIG. 2 is a block diagram illustrating an example keyword detection system, in accordance with aspects of the present disclosure.

FIG. 2 depicts an example keyword detection first stage 200, in accordance with aspects of the present disclosure. Keyword detection first stage 200 receives audio signals (e.g., PCM audio data from an analog mic, PDM high definition audio from a digital mic, and the like) from an audio source 202 in an electronic system. For example, the audio signals could be generated by one or more microphones of an electronic device, such as a mobile electronic device, smart home device, internet of things (IoT) device, or other edge processing device. In some cases, the audio signal may be received substantially in real time.

In some cases, certain devices, such as relatively low-power (e.g., battery operated) devices may include a two-stage speech recognition system where a keyword detection first stage 200 listens for and detects a keyword. In some cases, the keyword detection first stage 200 may be implemented using a relatively lower-powered circuit such as a DSP, codec circuit, etc. When a keyword is detected, a second stage 214 may be activated which may, for example, handle more complex tasks, such as more freeform word recognition, detecting commands, performing tasks, etc. In some cases, the second stage may be performed on a relatively higher-powered circuit, such as a processor, GPU, ML/AI processor, etc.

The received audio signals are processed by a feature generator 204. Feature generator 204 may be, for example, a hardware-implemented Fourier transformation, such as a fast Fourier transformation (FFT) function or circuit. A Fourier transform is generally a function for deconstructing a time domain representation of a signal, such as the received audio signals, into a frequency domain representation. The frequency domain representation may include voltages or powers present at varying frequencies in the received audio signals. In some cases, the feature generator 204 may generate a set of features, such as a feature vector, based on these representations. This set of features may be output to a keyword detector 208. An example embodiment of feature generator 204 is described in more detail with respect to FIG. 3. Notably, other or additional forms of feature generation may be used in other embodiments.

Keyword detector 208 may use a keyword detection model 212 to determine whether the received audio signal includes portions of a keyword. In some cases, the keyword detector 208 may accept, as input, tens to hundreds of audio frames per second and the keyword detector 208 may attempt to detect parts of the keyword in an audio signal. In some cases, the keyword detection model 212 of keyword detector 208 may be a part of a multi-stage speech recognition system.

After the keyword detector 208 determines that a keyword was detected in the received audio signal, the keyword detector 208 generates a signal for a second stage 214. For example, a detected keyword may cause an application to launch, or another part of the electronic device to wake up (e.g., a screen, other processor, or other sensor), a query to be run locally or at a remote data service, additional speech recognition processing, and the like. In some embodiments, the second stage 214 may receive an indication that keyword has been detected, while in other embodiments, second stage 214 may receive additional information, such as information specific to the detected keyword, such as one or more detected keywords in the voice activity. Notably, there may be additional functions (not shown) between keyword detector 208 and second stage 214, such as additional stages of keyword detection or analysis.

Figure 3:
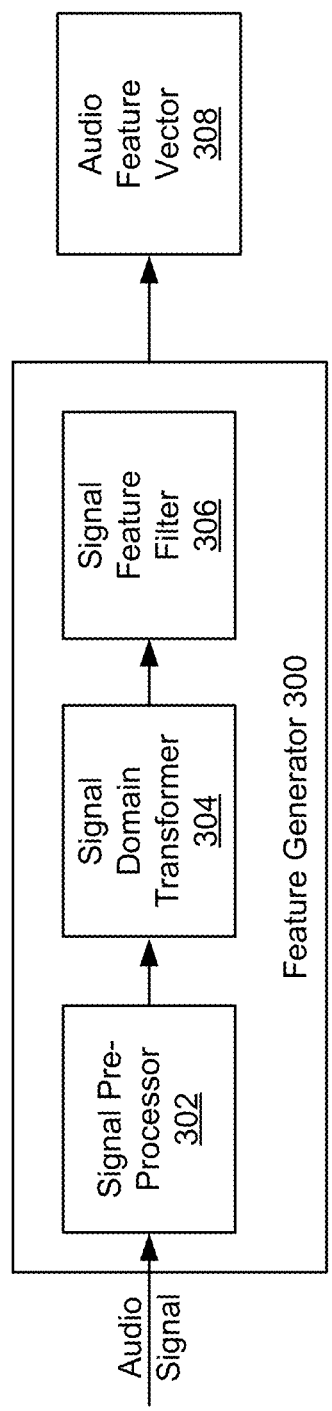
FIG. 3 is a block diagram illustrating an example feature generator, in accordance with aspects of the present disclosure.

FIG. 3 depicts an example embodiment of a feature generator 300, such as feature generator 204 of FIG. 2, in accordance with aspects of the present disclosure. It should be understood that many techniques may be used to generate feature vectors for an audio and that feature generator 300 is just a single example of a technique that may be used to generate feature vectors.

Feature generator 300 receives an audio signal at signal pre-processor 302. As above, the audio signal may be from an audio source, such as audio source 202, of an electronic device, such a microphone.

Signal pre-processor 302 may perform various pre-processing steps on the received audio signal. For example, signal pre-processor 302 may split the audio signal into parallel audio signals and delay one of the signals by a predetermined amount of time to prepare the audio signals for input into an FFT circuit.

As another example, signal pre-processor 302 may perform a windowing function, such as a Hamming, Hann, Blackman-Harris, Kaiser-Bessel window function, or other sine-based window function, which may improve the performance of further processing stages, such as signal domain transformer 304. Generally, a windowing (or window) function in may be used to reduce the amplitude of discontinuities at the boundaries of each finite sequence of received audio signal data to improve further processing.

As another example, signal pre-processor 302 may convert the audio signal data from parallel to serial, or vice versa, for further processing. The pre-processed audio signal from the signal pre-processor 302 may be provided to signal domain transformer 304, which may transform the pre-processed audio signal from a first domain into a second domain, such as from a time domain into a frequency domain.

In some embodiments, signal domain transformer 304 implements a Fourier transformation, such as a fast Fourier transformation. For example, in some embodiments, the fast Fourier transformation may be a 16-band (or bin, channel, or point) fast Fourier transform, which generates a compact feature set that may be efficiency processed by a model. Beneficially, a Fourier transform provides fine spectral domain information about the incoming audio signal as compared to conventional single channel processing, such as conventional hardware SNR threshold detection.

The result of signal domain transformer 304 is a set of audio features, such as a set of voltages, powers, or energies per frequency band in the transformed data.

The set of audio features may then be provided to signal feature filter 306, which may reduce the size of or compress the feature set in the audio feature data. In some embodiments, signal feature filter 306 may discard certain features from the audio feature set, such as symmetric or redundant features from multiple bands of a multi-band fast Fourier transform. Discarding this data reduces the overall size of the data stream for further processing, and may be referred to a compressing the data stream.

For example, in some embodiments, a 16-band FFT may include 8 symmetric or redundant bands of after the powers are squared because audio signals are real. Thus, signal feature filter 306 may filter out the redundant or symmetric band information and output an audio feature vector 308. In some cases, output of the signal feature filter may be compressed or otherwise processed prior to output as the audio feature vector 308.

The audio feature vector 308 may be provided to a keyword detector for processing by a keyword detection model, such as keyword detector 208 and keyword detection model 212 as shown in FIG. 2.

In some cases, the voice detection model, such as keyword detection model 212, may execute on SoC 100 and/or components thereof, such as the DSP 106/NPU 108. In some cases, the voice detection model may be a machine learning model or system.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as speech analysis, audio signal analysis, image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases. Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Figure 4A:
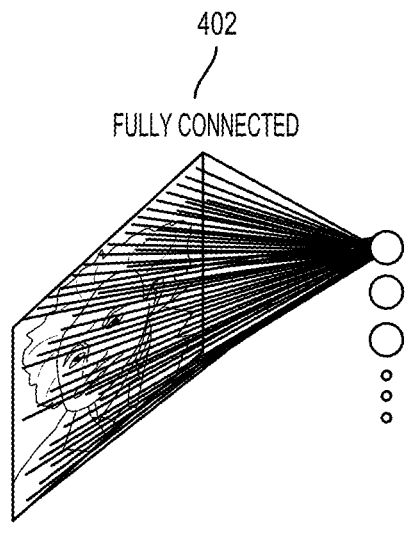
FIG. 4A-4C are diagrams illustrating examples of neural networks, in accordance with some examples.
Figure 4B:
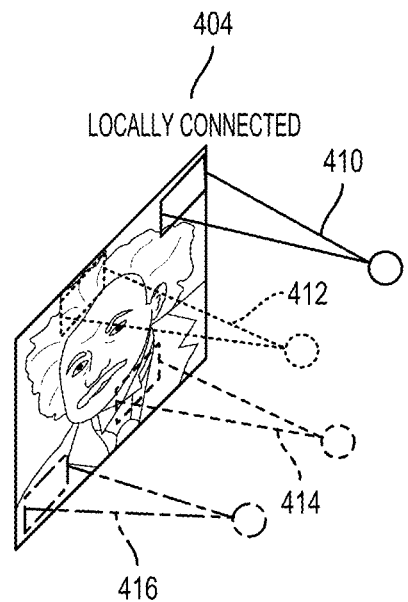
Figure 4C:
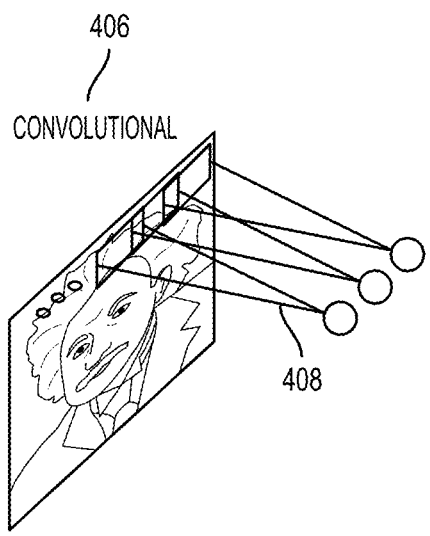

FIGS. 4A-4C illustrate example neural networks which may be used for keyword detection, in accordance with aspects of the present disclosure. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

In some cases, the connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, as the higher layer neurons in a given region may receive inputs that are tuned through training to the properties of a restricted portion of the total input to the network.

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 5:
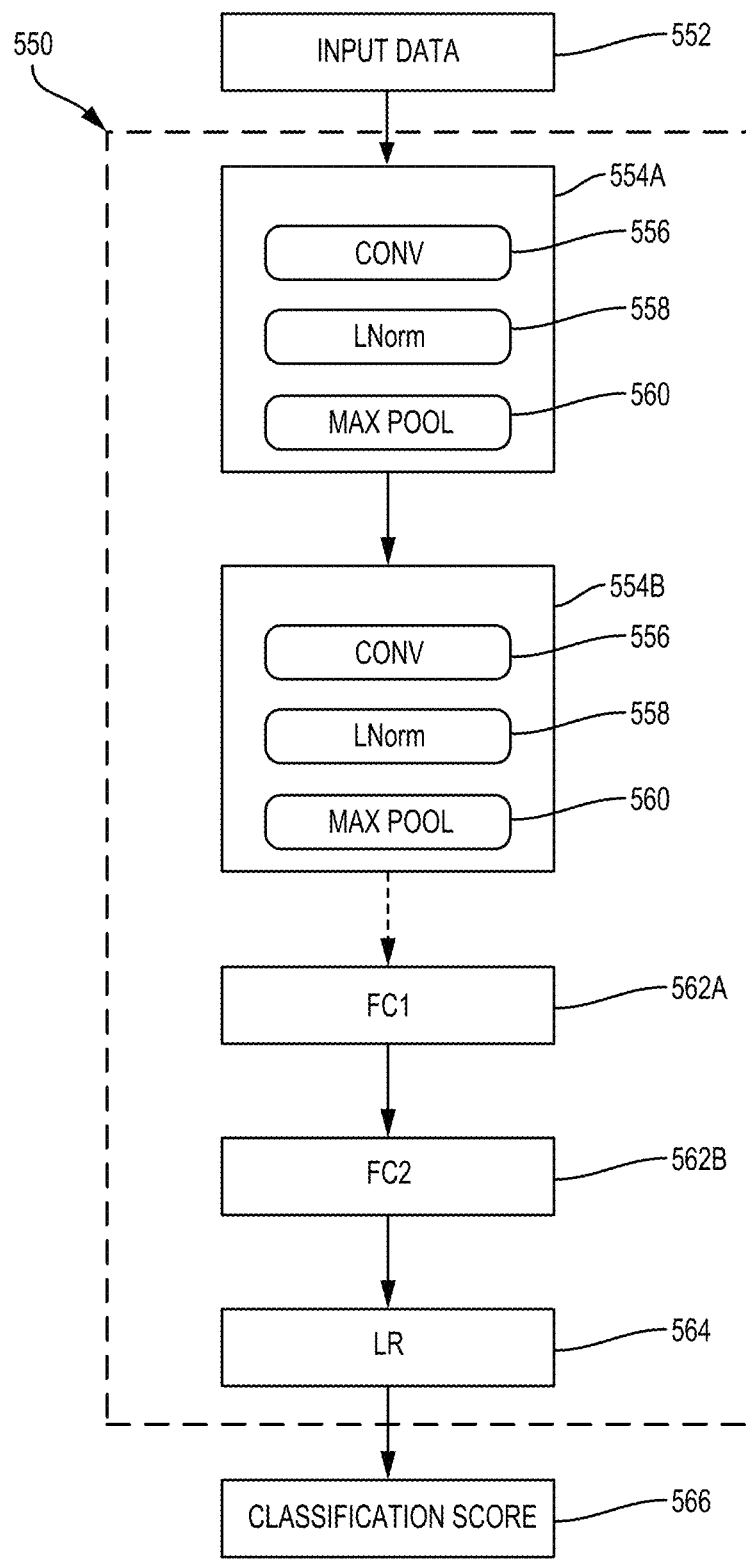
FIG. 5 is a block diagram illustrating an example of a deep convolutional network (DCN), in accordance with aspects of the present disclosure.

FIG. 5 is a block diagram illustrating an example of a deep convolutional network (DCN) 550, in accordance with aspects of the present disclosure. The DCN 550 may include multiple different types of layers based on connectivity and weight sharing. As shown in FIG. 5, the DCN 550 includes the convolution blocks 554A, 554B. Each of the convolution blocks 554A, 554B may be configured with a convolution layer (CONV) 556, a normalization layer (LNorm) 558, and a max pooling layer (MAX POOL) 560.

The convolution layers 556 may include one or more convolutional filters, which may be applied to the input data 552 to generate a feature map. Although only two convolution blocks 554A, 554B are shown, the present disclosure is not so limiting, and instead, any number of convolution blocks (e.g., blocks 554A, 554B) may be included in the DCN 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the DCN 550 may access other processing blocks that may be present on the SOC 100, such as sensor processor 114 and keyword detection system 120, dedicated, respectively, to sensors and navigation.

The deep convolutional network 550 may also include one or more fully connected layers, such as layer 562A (labeled "FC1") and layer 562B (labeled "FC2"). The DCN 550 may further include a logistic regression (LR) layer 564.

Between each layer 556, 558, 560, 562A, 562B, 564 of the DCN 550 are weights (not shown) that are to be updated. The output of each of the layers (e.g., 556, 558, 560, 562A, 562B, 564) may serve as an input of a succeeding one of the layers (e.g., 556, 558, 560, 562A, 562B, 564) in the deep convolutional network 550 to learn hierarchical feature representations from input data 552 (e.g., images, audio, video, sensor data and/or other input data) supplied at the first of the convolution blocks 554A.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new input and a forward pass through the network may yield an output 422 that may be considered an inference or a prediction of the DCN.

The output of the DCN 550 is a classification score 566 for the input data 552. The classification score 566 may be a probability, or a set of probabilities, where the probability is the probability of the input data including a feature from a set of features the DCN 550 is trained to detect.

In some cases, a ML system or model may be used to analyze each audio frame to determine whether a voice command may be present. For keyword detection, the output of the ML network, such as the probability may be referred to as a frame score. This frame score indicates a likelihood that the frame includes one or more portions of a voice command, such as a keyword. As an example, where keyword detection responds to the keyword "hey device," a first audio frame may have an audio signal that includes sounds corresponding to "he." The ML network, should output a higher frame score for the first audio frame as compared to another audio frame which does not have an audio signal that includes sounds corresponding to parts of "hey device." While discussed in the context of a ML system herein, in some cases, a non-ML technique may be used to analyze audio frames to generate frame scores and determine whether a voice command may be present. For example, a Gaussian mixture model (GMM), hidden Markov model (HMM) (GMM-HMM), dynamic time warping (DTW), and/or other processes like phoneme likelihood estimation, Viterbi decoding, etc. using Gaussian acoustic models and/or N-gram language models may be used. These non-ML techniques may also be skipped based on techniques discussed herein.

Generally, a ML system or model may be relatively complex and power intensive to execute, and it may be beneficial to reduce the use of the ML system or model to help reduce power consumption of a keyword detection system. In accordance with aspects of the present disclosure, an audio frame which is relatively similar to a previous audio frame may not need to be analyzed for presence of a voice command. For example, audio frames obtained from a quiet environment may be relatively similar to each other. However, when a voice command is given, the audio frames with the voice command should be relatively different from audio frames obtained from the quiet environment. In some cases, adaptive frame skipping may be implemented based on how different an audio frame is from another audio frame may be determined based on feature vectors associated with the audio frames.

Figure 6:
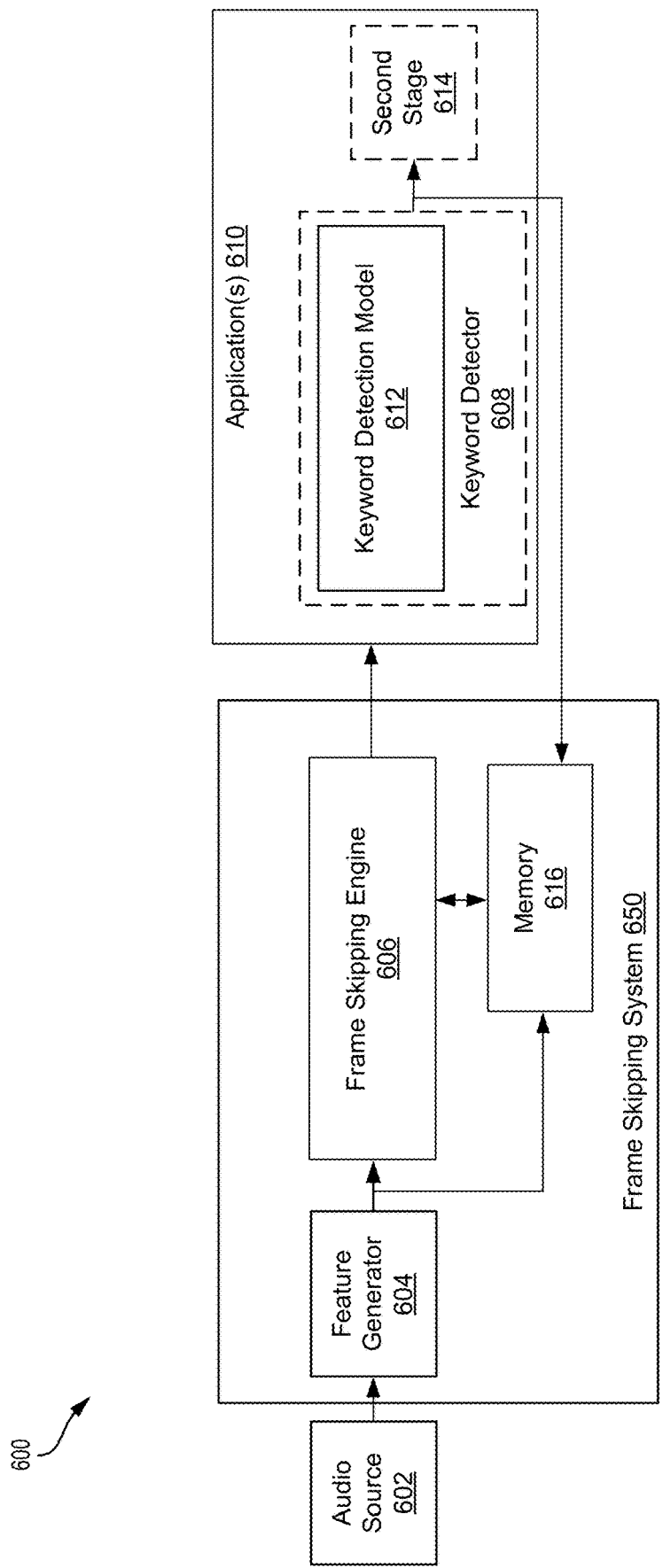
FIG. 6 is a block diagram illustrating a keyword detection system with adaptive frame skipping, in accordance with aspects of the present disclosure.

FIG. 6 is a block diagram illustrating an adaptive frame skipping system 600, in accordance with aspects of the present disclosure. The adaptive frame skipping system 600 may be used with any type of application (e.g., keyword detection, noise suppression, spatial filtering, etc.), including one or more applications 610. The frame skipping system 650 includes a feature generator 604 which can receive audio signals from an audio source 602, a frame skipping engine 606, and a memory 616 (or multiple memories or memory devices in some cases).

In some cases, the one or more applications 610 may process audio frames received from the frame skipping system 650. The one or more applications 610 may process the audio frames to perform keyword detection, noise suppression, spatial filtering, or other audio processing of the audio frames. For example, as shown in FIG. 6A, the one or more applications 610 may include a keyword detector 608. Additionally or alternatively, in some cases, the one or more applications 610 may include one or more other applications, such as a noise suppression application, a spatial filtering application, and/or other applications. While examples described herein are with respect to keyword detection (and the keyword detector 608), such examples may also apply to other types of applications (e.g., noise suppression, spatial filtering, etc.). The keyword detector 608 includes a keyword detection model 612 configured to detect one or more keywords in a frame of audio. In some cases, the keyword detection model 612 may generate a signal for a second stage 614.

In some cases, audio source 602, feature generator 604, keyword detector 608, and keyword detection model 612 may be substantially similar to audio source 202, feature generator 204, keyword detector 208, and keyword detection model 212, respectively, of FIG. 2. The feature generator 604 may generate a set of features, such as in a form of a feature vector from audio frames obtained (e.g., received, retrieved, etc.) from the audio source 602. As an example, for a time frame t, the feature generator 604 may generate a feature vector describing the audio signal received during time frame t. This feature vector for time frame t may be output to a frame skipping engine 606.

The frame skipping engine 606 may compare the feature vector for time frame t to a feature vector for a time frame prior to time frame t, such as for time frame t−1 (e.g., the previous frame), to determine a distance between the two vectors. In some cases, the distance between the two vectors can be determined by finding an absolute value of a difference (or subtracting) between corresponding positions of the two vectors, (e.g., abs (vector_t−1[1]-vector_t) and then summing the differences for the positions for the vectors (e.g., for vectors of length i, for vector positions 1 . . . n). In other cases, the distance between the two vectors may be determined by another technique, such as a Euclidean norm (e.g., distance), cosine similarity, or other distance metric. If the distance between the two vectors is below a threshold distance, then the two vectors are highly correlated and indicate that the audio signal received during time frame t is very similar to an audio signal received during time frame t−1.

If the distance between the two vectors (e.g., the feature vector for time frame t and the feature vector for time frame t−1) is below the threshold distance, the feature generator 604 may not output the feature vector to the one or more applications 610 (e.g., the keyword detector 608) for processing (e.g., by the keyword detection model 612). In some cases, the feature vector received for time frame t may be stored in memory 616 for comparison to a feature vector received for a future time, such as for time frame t+1.

If the distance between the two vectors (e.g., the feature vector for time frame t and the feature vector for time frame t−1) is above the threshold distance, the feature generator 604 may output the feature vector to the one or more applications 610 (e.g., the keyword detector 608) for processing (e.g., by the keyword detection model 612). In some cases, the feature vector received for time frame t may also be stored in memory 616 for comparison to a feature vector received for a future time, such as for time frame t+1.

In some cases, the frame skipping engine 606 may also consider a frame score to determine whether to skip passing an audio frame to the one or more applications 610 (e.g., the keyword detector 608). For example, the keyword detector 608 may store frame scores generated by the keyword detection model 612 from previous frames in the memory 616. As a more specific example, the keyword detector 608 may have stored a second frame score corresponding to time frame t−1 and a third frame score corresponding to time frame t−2 in the memory 616. As an example, where keyword detection responds to the keyword "hey device," a third audio frame at time t−2 may have an audio signal that includes sounds corresponding to a "he" sound. The keyword detection model 612 may generate and store a third audio score for the third audio frame. A second audio frame at time t−1 may have an audio signal that includes sounds corresponding to an "ay" sound. The keyword detection model 612 may generate a second audio score for this second audio frame and this second audio score may be higher than the third audio score. The keyword detector 608 may retrieve the second frame score and third frame score to determine whether the second frame score is greater than the third frame score (e.g., frame score for t−1>frame score for t−2). If the second frame score is greater than the third frame score, then the frame scores are increasing over time, indicating that a voice command could be received in the future (or is in the process of being received). Where the frame scores are previously increasing over time (e.g., in two or more time frames prior to time frame t), the feature vector for time frame t may be output to the keyword detector 608 for processing by the keyword detection model 612.

In some cases, if the frame scores are previously increasing over time, the feature vector for time frame t may be passed to the one or more applications 610 (e.g., the keyword detector 608 and/or other application) regardless of the distance between the two vectors. When the scores (e.g., probabilities) are increasing over a time frame, there is potentially a keyword being detected and irrespective of the distance between the feature vectors, frame skipping may avoided. The frame score generated by the keyword detection model 612 for time frame t may be stored in the memory 616. In some cases, if the frame scores were not previously increasing over time, the distance between the two vectors may be considered.

Continuing the previous example where the keyword detection responds to the keyword "hey device," a first audio frame at time t may have an audio signal that includes sounds corresponding to a "ma" sound. The keyword detection model 612 may generate a first audio score for this first audio frame and this first audio score may be lower than the third audio score and/or the second audio score. Thus, during processing of a feature vector for a fourth audio frame associated with time t+1, as the audio scores are trending downward, the distance between two vectors may be considered for frame skipping.

Figure 7:
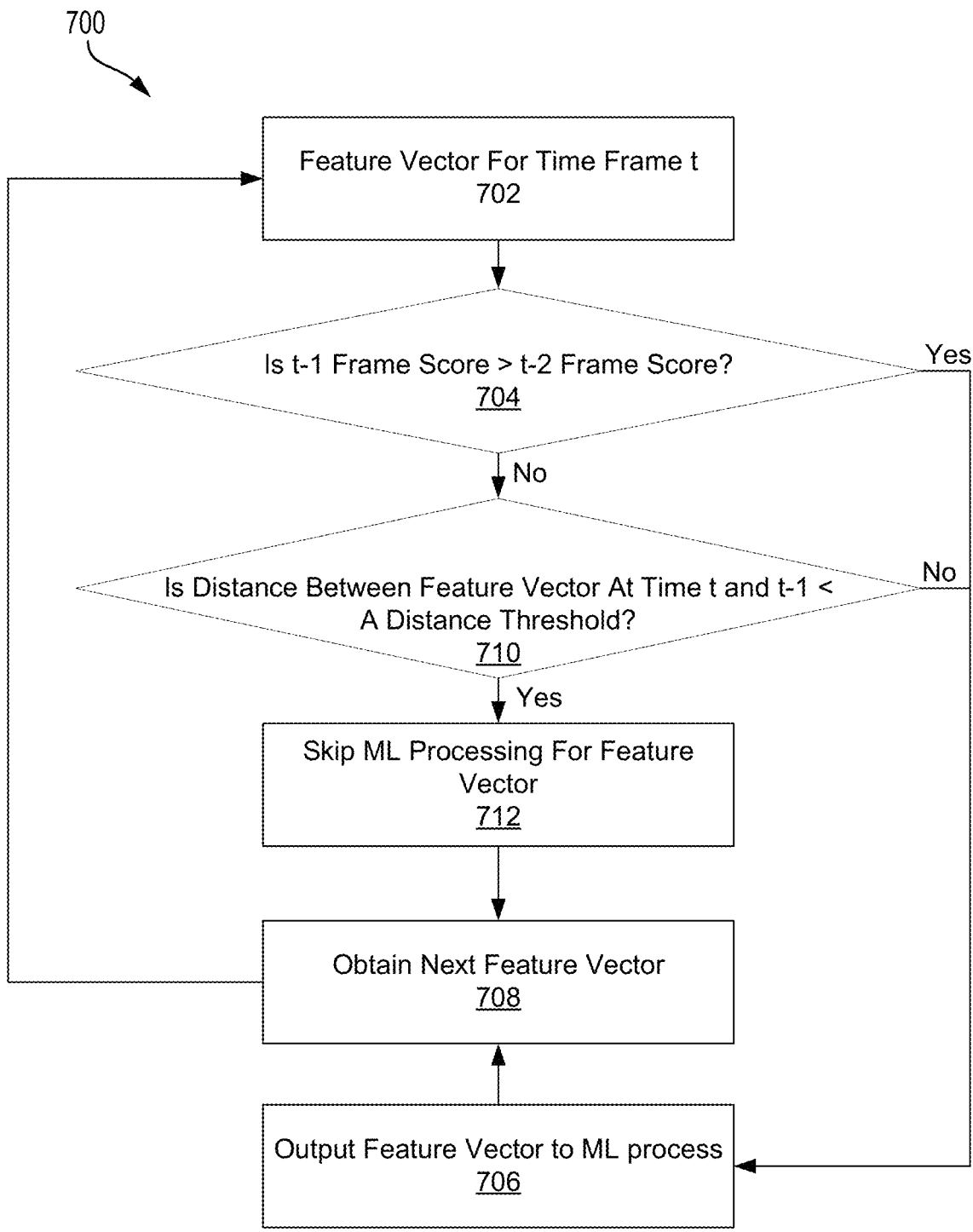
FIG. 7 is a flow diagram illustrating example adaptive audio frame skipping algorithm, in accordance with aspects of the present disclosure.

FIG. 7 is a flow diagram illustrating example a process 700 for performing adaptive audio frame skipping, in accordance with aspects of the present disclosure. At operation 702, a feature vector associated with time frame t is received. At operation 704, if a frame score associated with time frame t−1 is greater than a frame score associated with time frame t−2 (e.g., where frame scores were previously increasing over time), then execution proceeds to operation 706 where the feature vector for time frame t is output for processing by a ML process, such as keyword detection model 612. At operation 708 a next feature vector is obtained and execution may return to operation 702.

If the frame score associated with time frame t−1 is less than or equal to a frame score associated with time frame t−2 (e.g., where frame scores are not increasing over time), then execution proceeds to operation 710. At operation 710, if a distance between the feature vector associated with time frame t and a feature vector associated with time frame t−1 is greater than a threshold distance, then execution proceeds to operation 706 where the feature vector for time frame t is output for processing by the ML process, such as keyword detection model 612. At operation 708 a next feature vector is obtained and execution may return to operation 702.

At operation 710, if the distance between the feature vector associated with time frame t and the feature vector associated with time frame t−1 is less than a threshold distance F, then processing of the feature vector associated with time frame t by the ML process may be skipped at operation 712. At operation 708 a next feature vector is obtained and execution may return to operation 702.

Figure 8:
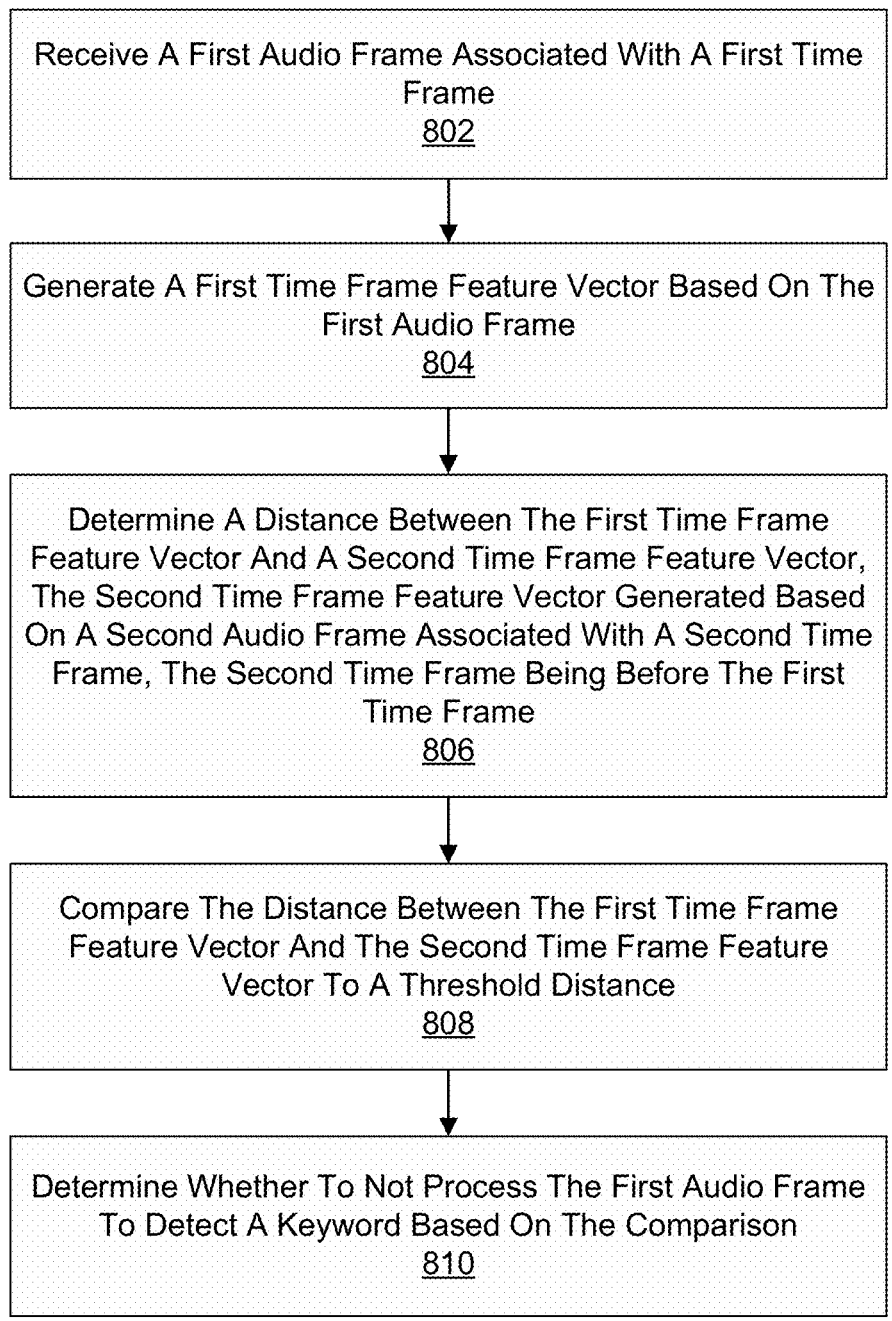
FIG. 8 is a block diagram illustrating a technique for adaptive frame skipping, in accordance with aspects of the present disclosure.

FIG. 8 is a block diagram illustrating a process 800 for adaptive frame skipping, in accordance with aspects of the present disclosure. At operation 802, the process 800 includes receiving a first audio frame associated with a first time frame.

At operation 804, the process 800 includes generating a first time frame feature vector based on the first audio frame. In some cases, the first time frame feature vector indicates characteristics of the received first audio frame.

At operation 806, the process 800 includes determining a distance between the first time frame feature vector and a second time frame feature vector, the second time frame feature vector generated based on a second audio frame associated with a second time frame. In some cases, the distance between the first time frame feature vector and the second time frame feature vector is determined based on one of: an absolute value of a difference between the first time frame feature vector and the second time frame feature vector; a Euclidean distance between the first time frame feature vector and the second time frame feature vector; or a cosine similarity between the first time frame feature vector and the second time frame feature vector. In some cases, the second time frame is before the first time frame.

At operation 808, the process 800 includes comparing the distance between the first time frame feature vector and the second time frame feature vector to a threshold distance. In some cases, process 800 includes storing the first time frame feature vector in a memory for comparison with a time frame feature vector of a later received audio frame.

At operation 810, the process 800 includes determining whether to skip processing of the first audio frame by an application based on the comparison. In some cases, process 800 includes determining not to process the first audio frame based on a determination that the distance between the first time frame feature vector and the second time frame feature vector is less than the threshold distance. In some cases, process 800 includes determining whether to skip processing of the first audio frame by a keyword detection application. In some cases, process 800 includes determining to use a machine learning model to process the first time frame feature vector to detect a keyword based on a determination that the distance between the first time frame feature vector and the second time frame feature vector is greater than the threshold distance. In some cases, process 800 includes determining whether to skip processing of the first audio frame by a noise suppression application.

In some cases, process 800 also includes generating, by a machine learning model, a third time frame score associated with a third time frame, the third time frame being before the second time frame, and wherein the third frame score indicates a probability that a third time frame feature vector associated with the third frame score includes a keyword; generating, by the machine learning model, a second frame score associated with the second time frame wherein the second frame score indicates a probability that the second time frame feature vector includes the keyword; and determining whether to use the machine learning model based on a comparison between the third frame score and the second frame score. In some cases, process 800 also includes determining that the second frame score indicates a higher probability than the third frame score; and determining to process the first audio frame based on the determination that the second frame score indicates a higher probability than the third frame score. In some cases, process 800 also includes determining that the third frame score indicates a higher probability than the second frame score; and determining to not to process the first audio frame based on the determination that the third frame score indicates a higher probability than the second frame score. In some cases, process 800 also includes storing the second frame score and third frame score in a memory. In some cases, process 800 also includes determining whether to skip processing of the first audio frame by a machine learning model based on the comparison.

In some aspects, the processes described herein (e.g., the process 700, the process 800, and/or any other process described herein) may be performed by a computing device or apparatus. In one example, the process 700, the process 800, and/or other technique or process described herein can be performed by the system of FIG. 6 (e.g., the frame skipping system 650, the keyword detector 608, etc.). In another example, the process 700, the process 800, and/or other technique or process described herein can be performed by the computing system 800 shown in FIG. 8. For instance, a computing device with the computing device architecture of the computing system 900 shown in FIG. 9 can implement the operations of the process 700, the process 800, and/or the components and/or operations described herein with respect to any of FIGS. 1 through 7.

The computing device can include any suitable device, such as a mobile device (e.g., a mobile phone), an extended reality (XR) device (e.g., a virtual reality (VR), augmented reality (AR), or mixed reality (MR) headset, AR or MR glasses, etc.), a wearable device (e.g., network-connected watch or other wearable device), a vehicle (e.g., an autonomous or semi-autonomous vehicle) or computing system or device of the vehicle, a desktop computing device, a tablet computing device, a server computer, a robotic device, a laptop computer, a network-connected television, a camera, and/or any other computing device with the resource capabilities to perform the processes described herein, including the process 700, the process 800, and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 700 and the process 800 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700, the process 800, and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
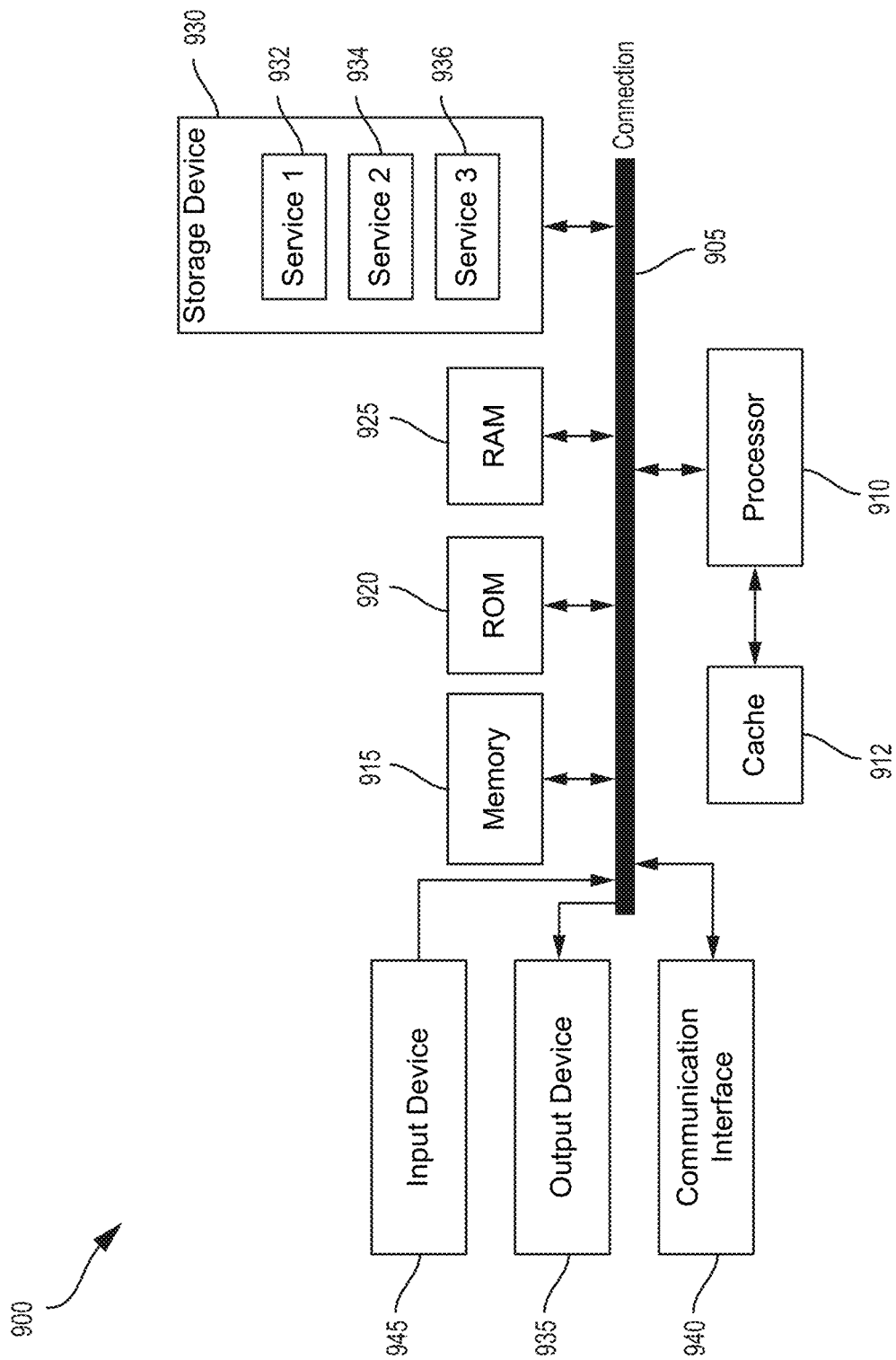
FIG. 9 is an example computing device architecture of an example computing device that can implement the various techniques described herein.

FIG. 9 shows an example of computing system 900, which can implement the various techniques described herein. For example, the computing system 900 can implement the adaptive frame skipping system described with respect to FIG. 6, the adaptive audio frame skipping process 700 of FIG. 7, the process 800 for adaptive frame skipping of FIG. 8, and/or any other adaptive frame skipping system or process described herein. The components of the computing system 900 are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache of high-speed memory 912 connected directly with, in close proximity to, or integrated as part of processor 910. In some cases, the computing system 900 can copy data from memory 915 and/or the storage device 930 to the cache 912 for quick access by processor 910. In this way, the cache can provide a performance enhancement that avoids processor 910 delays while waiting for data. These and other modules can control or be configured to control processor 910 to perform various actions. Other computing device memory 915 may be available for use as well. Memory 915 can include multiple different types of memory with different performance characteristics.

Processor 910 can include any general purpose processor and a hardware service or software service, such as a service 1 932, a service 2 934, and a service 3 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art, such as a display, projector, television, speaker device, etc. In some instances, multimodal systems can enable a user to provide multiple types of input/output to communicate with computing system 900. Computing system 900 can include communication interface 940, which can generally govern and manage the user input and system output. The communication interface may perform or facilitate receipt and/or transmission of wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.9 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communication interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc optical disc, a holographic optical disk, another optical medium, a secure digital (SD) card, a micro secure digital (microSD) card, a Memory Stick® card, a smartcard chip, a Europay Master-card and Visa (EMV) chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services (e.g., service 1 932, service 2 934, and service 3 936, and/or other services), servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for processing audio signals, comprising: at least one memory; and at least one processor coupled to the at least one memory, the at least one processor configured to: receive a first audio frame associated with a first time frame; generate a first time frame feature vector based on the first audio frame; determine a distance between the first time frame feature vector and a second time frame feature vector, the second time frame feature vector generated based on a second audio frame associated with a second time frame; compare the distance between the first time frame feature vector and the second time frame feature vector to a threshold distance; and determine whether to skip processing of the first audio frame by an application based on the comparison.

Aspect 2. The apparatus of Aspect 1, wherein the at least one processor is configured to determine not to process the first audio frame based on a determination that the distance between the first time frame feature vector and the second time frame feature vector is less than the threshold distance.

Aspect 3. The apparatus of any of Aspects 1 or 2, wherein the at least one processor is configured to determine whether to skip processing of the first audio frame by a keyword detection application.

Aspect 4. The apparatus of Aspect 3, wherein the at least one processor is configured to determine to use a machine learning model to process the first time frame feature vector to detect a keyword based on a determination that the distance between the first time frame feature vector and the second time frame feature vector is greater than the threshold distance.

Aspect 5. The apparatus of any of Aspects 3 or 4, wherein the at least one processor is configured to: generate, by a machine learning model, a third time frame score associated with a third time frame, the third time frame being before the second time frame, and wherein the third frame score indicates a probability that a third time frame feature vector associated with the third frame score includes a keyword; generate, by the machine learning model, a second frame score associated with the second time frame wherein the second frame score indicates a probability that the second time frame feature vector includes the keyword; and determine whether to use the machine learning model based on a comparison between the third frame score and the second frame score.

Aspect 6. The apparatus of Aspect 5, wherein the at least one processor is configured to: determine that the second frame score indicates a higher probability than the third frame score; and determine to process the first audio frame based on the determination that the second frame score indicates a higher probability than the third frame score.

Aspect 7. The apparatus of any of Aspects 5 or 6, wherein the at least one processor is configured to: determine that the third frame score indicates a higher probability than the second frame score; and determine to not to process the first audio frame based on the determination that the third frame score indicates a higher probability than the second frame score.

Aspect 8. The apparatus of any of Aspects 5 to 7, wherein the at least one processor is configured to store the second frame score and third frame score in the memory.

Aspect 9. The apparatus of any of Aspects 1 to 8, wherein the at least one processor is configured to determine the distance between the first time frame feature vector and the second time frame feature vector based on one of: an absolute value of a difference between the first time frame feature vector and the second time frame feature vector; a Euclidean distance between the first time frame feature vector and the second time frame feature vector; or a cosine similarity between the first time frame feature vector and the second time frame feature vector.

Aspect 10. The apparatus of any of Aspects 1 to 9, wherein the at least one processor is configured to store the first time frame feature vector in the memory for comparison with a time frame feature vector of a later received audio frame.

Aspect 11. The apparatus of any of Aspects 1 to 10, wherein the first time frame feature vector indicates characteristics of the received first audio frame.

Aspect 12. The apparatus of any of Aspects 1 to 11, wherein the at least one processor is configured to determine whether to skip processing of the first audio frame by a noise suppression application.

Aspect 13. The apparatus of any of Aspects 1 to 12, wherein the second time frame is before the first time frame.

Aspect 14. The apparatus of any of Aspects 1 to 13, wherein the at least one processor is configured to determine whether to skip processing of the first audio frame by a machine learning model based on the comparison.

Aspect 15. A method for processing audio signals, comprising: receiving a first audio frame associated with a first time frame; generating a first time frame feature vector based on the first audio frame; determining a distance between the first time frame feature vector and a second time frame feature vector, the second time frame feature vector generated based on a second audio frame associated with a second time frame; comparing the distance between the first time frame feature vector and the second time frame feature vector to a threshold distance; and determining whether to skip processing of the first audio frame by an application based on the comparison.

Aspect 16. The method of Aspect 15, further comprising determining not to process the first audio frame based on a determination that the distance between the first time frame feature vector and the second time frame feature vector is less than the threshold distance.

Aspect 17. The method of any of Aspects 15 or 16, further comprising determining whether to skip processing of the first audio frame by a keyword detection application.

Aspect 18. The method of Aspect 17, further comprising determining to use a machine learning model to process the first time frame feature vector to detect a keyword based on a determination that the distance between the first time frame feature vector and the second time frame feature vector is greater than the threshold distance.

Aspect 19. The method of any of Aspects 17 or 18, further comprising: generating, by a machine learning model, a third time frame score associated with a third time frame, the third time frame being before the second time frame, and wherein the third frame score indicates a probability that a third time frame feature vector associated with the third frame score includes a keyword; generating, by the machine learning model, a second frame score associated with the second time frame wherein the second frame score indicates a probability that the second time frame feature vector includes the keyword; and determining whether to use the machine learning model based on a comparison between the third frame score and the second frame score.

Aspect 20. The method of Aspect 19, further comprising: determining that the second frame score indicates a higher probability than the third frame score; and determining to process the first audio frame based on the determination that the second frame score indicates a higher probability than the third frame score.

Aspect 21. The method of any of Aspects 19 or 20, further comprising: determining that the third frame score indicates a higher probability than the second frame score; and determining to not to process the first audio frame based on the determination that the third frame score indicates a higher probability than the second frame score.

Aspect 22. The method of any of Aspects 19 to 21, further comprising storing the second frame score and third frame score in a memory.

Aspect 23. The method of any of Aspects 15 to 22, wherein the distance between the first time frame feature vector and the second time frame feature vector is determined based on one of: an absolute value of a difference between the first time frame feature vector and the second time frame feature vector; a Euclidean distance between the first time frame feature vector and the second time frame feature vector; or a cosine similarity between the first time frame feature vector and the second time frame feature vector.

Aspect 24. The method of any of Aspects 15 to 23, further comprising storing the first time frame feature vector in a memory for comparison with a time frame feature vector of a later received audio frame.

Aspect 25. The method of any of Aspects 15 to 24, wherein the first time frame feature vector indicates characteristics of the received first audio frame.

Aspect 26. The method of any of Aspects 15 to 25, further comprising determining whether to skip processing of the first audio frame by a noise suppression application.

Aspect 27. The method of any of Aspects 15 to 26, wherein the second time frame is before the first time frame.

Aspect 28. The method of any of Aspects 15 to 27, further comprising determining whether to skip processing of the first audio frame by a machine learning model based on the comparison.

Aspect 29. A non-transitory computer-readable medium having stored thereon instructions that, when executed by one or more processors, cause the at one or more processors to: receive a first audio frame associated with a first time frame; generate a first time frame feature vector based on the first audio frame; determine a distance between the first time frame feature vector and a second time frame feature vector, the second time frame feature vector generated based on a second audio frame associated with a second time frame; compare the distance between the first time frame feature vector and the second time frame feature vector to a threshold distance; and determine whether to skip processing of the first audio frame by an application based on the comparison.

Aspect 30. The non-transitory computer-readable medium of Aspect 29, wherein the instructions further cause the one or more processors to determine not to process the first audio frame based on a determination that the distance between the first time frame feature vector and the second time frame feature vector is less than the threshold distance.

Aspect 31. The non-transitory computer-readable medium of any of Aspects 29 or 30, wherein the instructions further cause the one or more processors to determine whether to skip processing of the first audio frame by a keyword detection application.

Aspect 32. The non-transitory computer-readable medium of Aspect 31, wherein the instructions further cause the one or more processors to determine to use a machine learning model to process the first time frame feature vector to detect a keyword based on a determination that the distance between the first time frame feature vector and the second time frame feature vector is greater than the threshold distance.

Aspect 33. The non-transitory computer-readable medium of any of Aspects 31 or 32, wherein the instructions further cause the one or more processors to: generate, by a machine learning model, a third time frame score associated with a third time frame, the third time frame being before the second time frame, and wherein the third frame score indicates a probability that a third time frame feature vector associated with the third frame score includes a keyword; generate, by the machine learning model, a second frame score associated with the second time frame wherein the second frame score indicates a probability that the second time frame feature vector includes the keyword; and determine whether to use the machine learning model based on a comparison between the third frame score and the second frame score.

Aspect 34. The non-transitory computer-readable medium of Aspect 33, wherein the instructions further cause the one or more processors to: determine that the second frame score indicates a higher probability than the third frame score; and determine to process the first audio frame based on the determination that the second frame score indicates a higher probability than the third frame score.

Aspect 35. The non-transitory computer-readable medium of any of Aspects 33 or 34, wherein the instructions further cause the one or more processors to: determine that the third frame score indicates a higher probability than the second frame score; and determine to not to process the first audio frame based on the determination that the third frame score indicates a higher probability than the second frame score.

Aspect 36. The non-transitory computer-readable medium of any of Aspects 33 to 35, wherein the instructions further cause the one or more processors to store the second frame score and third frame score in the memory.

Aspect 37. The non-transitory computer-readable medium of any of Aspects 29 to 36, wherein the distance between the first time frame feature vector and the second time frame feature vector is determined based on one of: an absolute value of a difference between the first time frame feature vector and the second time frame feature vector; a Euclidean distance between the first time frame feature vector and the second time frame feature vector; or a cosine similarity between the first time frame feature vector and the second time frame feature vector.

Aspect 38. The non-transitory computer-readable medium of any of Aspects 29 to 37, wherein the instructions further cause the one or more processors to store the first time frame feature vector in the memory for comparison with a time frame feature vector of a later received audio frame.

Aspect 39. The non-transitory computer-readable medium of any of Aspects 29 to 38, wherein the first time frame feature vector indicates characteristics of the received first audio frame.

Aspect 40. The non-transitory computer-readable medium of any of Aspects 29 to 39, wherein the instructions further cause the one or more processors to determine whether to skip processing of the first audio frame by a noise suppression application.

Aspect 41. The non-transitory computer-readable medium of any of Aspects 29 to 40, wherein the second time frame is before the first time frame.

Aspect 42. The non-transitory computer-readable medium of any of Aspects 29 to 41, wherein the instructions further cause the one or more processors to determine whether to skip processing of the first audio frame by a machine learning model based on the comparison.

Aspect 43. An apparatus for processing audio signals, the apparatus comprising one or more means for performing operations according to any of Aspects 1 to 42.

What is claimed is:

1. An apparatus for processing audio signals, comprising:
at least one memory; and
at least one processor coupled to the at least one memory, wherein the at least one processor is configured to:
   obtain a first audio frame associated with a first time frame;
   generate a first time frame feature vector based on the first audio frame;
   determine a distance between the first time frame feature vector and a second time frame feature vector, the second time frame feature vector generated based on a second audio frame associated with a second time frame;
   compare the distance between the first time frame feature vector and the second time frame feature vector to a threshold distance;
   determine whether to skip processing of the first audio frame by a keyword application based on the comparison;
   generate, by a machine learning model, a third time frame score associated with a third time frame, the third time frame being before the second time frame, and wherein the third frame score indicates that a third time frame feature vector, associated with the third frame score, is a representation of a first portion of a keyword;
   generate, by the machine learning model, a second frame score associated with the second time frame, wherein the second frame score indicates that the second time frame feature vector is a representation of a second portion of the keyword;
   determine that the second frame score is greater than the third frame score; and
   determine to process the first audio frame, by the machine learning model based on the determination that the second frame score is greater than the third frame score.

2. The apparatus of claim 1, wherein the at least one processor is configured to determine not to process the first audio frame based on a determination that the distance between the first time frame feature vector and the second time frame feature vector is less than the threshold distance.

3. The apparatus of claim 1, wherein the at least one processor is configured to determine to use a machine learning model to process the first time frame feature vector to detect the keyword based on a determination that the distance between the first time frame feature vector and the second time frame feature vector is greater than the threshold distance.

4. The apparatus of claim 1, wherein the at least one processor is configured to store the second frame score and third frame score in the memory.

5. The apparatus of claim 1, wherein the at least one processor is configured to determine the distance between the first time frame feature vector and the second time frame feature vector based on one of:
- an absolute value of a difference between the first time frame feature vector and the second time frame feature vector;
- a Euclidean distance between the first time frame feature vector and the second time frame feature vector; or
- a cosine similarity between the first time frame feature vector and the second time frame feature vector.

6. The apparatus of claim 1, wherein the at least one processor is configured to store the first time frame feature vector in the memory for comparison with a time frame feature vector of a later received audio frame.

7. The apparatus of claim 1, wherein the first time frame feature vector indicates characteristics of the received first audio frame.

8. The apparatus of claim 1, wherein the at least one processor is configured to determine whether to skip processing of the first audio frame by a noise suppression application.

9. The apparatus of claim 1, wherein the second time frame is before the first time frame.

10. The apparatus of claim 1, wherein the at least one processor is configured to determine whether to skip processing of the first audio frame by the machine learning model based on the comparison.

11. A method for processing audio signals, comprising:
receiving a first audio frame associated with a first time frame;
generating a first time frame feature vector based on the first audio frame;
determining a distance between the first time frame feature vector and a second time frame feature vector, the second time frame feature vector generated based on a second audio frame associated with a second time frame;
comparing the distance between the first time frame feature vector and the second time frame feature vector to a threshold distance;
determining whether to skip processing of the first audio frame by a keyword application based on the comparison;
generating, by a machine learning model, a third time frame score associated with a third time frame, the third time frame being before the second time frame, and wherein the third frame score indicates a probability that a third time frame feature vector, associated with the third frame score, is a presentation of a first portion of a keyword;
generating, by the machine learning model, a second frame score associated with the second time frame wherein the second frame score indicates that the second time frame feature vector is a representation of a second portion of the keyword;
determining that the third frame score is greater than the second frame score; and
determining to not process the first audio frame based on the determination that the third frame score is greater than the second frame score.

12. The method of claim 11, further comprising determining not to process the first audio frame based on a determination that the distance between the first time frame feature vector and the second time frame feature vector is less than the threshold distance.

13. The method of claim 11, further comprising determining to use the machine learning model to process the first time frame feature vector to detect the keyword based on a determination that the distance between the first time frame feature vector and the second time frame feature vector is greater than the threshold distance.

14. The method of claim 11, further comprising storing the second frame score and third frame score in a memory.

15. The method of claim 11, wherein the distance between the first time frame feature vector and the second time frame feature vector is determined based on one of:
- an absolute value of a difference between the first time frame feature vector and the second time frame feature vector;
- a Euclidean distance between the first time frame feature vector and the second time frame feature vector; or
- a cosine similarity between the first time frame feature vector and the second time frame feature vector.

16. The method of claim 11, further comprising storing the first time frame feature vector in a memory for comparison with a time frame feature vector of a later received audio frame.

17. The method of claim 11, wherein the first time frame feature vector indicates characteristics of the received first audio frame.

18. The method of claim 11, further comprising determining whether to skip processing of the first audio frame by a noise suppression application.

19. The method of claim 11, wherein the second time frame is before the first time frame.

20. The method of claim 11, further comprising determining whether to skip processing of the first audio frame by the machine learning model based on the comparison.

21. A non-transitory computer-readable medium having stored thereon instructions that, when executed by one or more processors, cause the at one or more processors to:
receive a first audio frame associated with a first time frame;
generate a first time frame feature vector based on the first audio frame;
determine a distance between the first time frame feature vector and a second time frame feature vector, the second time frame feature vector generated based on a second audio frame associated with a second time frame;
compare the distance between the first time frame feature vector and the second time frame feature vector to a threshold distance;
determine whether to skip processing of the first audio frame by a keyword application based on the comparison;
generate, by a machine learning model, a third time frame score associated with a third time frame, the third time frame being before the second time frame, and wherein the third frame score indicates that a third time frame feature vector, associated with the third frame score, is a representation of a first portion of a keyword;

generate, by the machine learning model, a second frame score associated with the second time frame, wherein the second frame score indicates that the second time frame feature vector is a representation of a second portion of the keyword;

determine that the second frame score is greater than the third frame score; and determine to process the first audio frame, my the machine learning model based on the determination that the second frame score is greater than the third frame score.

22. The non-transitory computer-readable medium of claim 21, wherein the instructions further cause the one or more processors to determine not to process the first audio frame based on a determination that the distance between the first time frame feature vector and the second time frame feature vector is less than the threshold distance.

23. The non-transitory computer-readable medium of claim 21, wherein the instructions further cause the one or more processors to determine to use a machine learning model to process the first time frame feature vector to detect a keyword based on a determination that the distance between the first time frame feature vector and the second time frame feature vector is greater than the threshold distance.

24. The non-transitory computer-readable medium of claim 21, wherein the instructions further cause the one or more processors to store the second frame score and the third frame score in memory.

25. The non-transitory computer-readable medium of claim 21, wherein the distance between the first time frame feature vector and the second time frame feature vector is determined based on one of:
- an absolute value of a difference between the first time frame feature vector and the second time frame feature vector;
- a Euclidean distance between the first time frame feature vector and the second time frame feature vector; or
- a cosine similarity between the first time frame feature vector and the second time frame feature vector.

26. The non-transitory computer-readable medium of claim 21, wherein the instructions further cause the one or more processors to store the first time frame feature vector in memory for comparison with a time frame feature vector of a later received audio frame.

27. The non-transitory computer-readable medium of claim 21, wherein the first time frame feature vector indicates characteristics of the received first audio frame.

28. The non-transitory computer-readable medium of claim 21, wherein the instructions further cause the one or more processors to determine whether to skip processing of the first audio frame by a noise suppression application.

29. The non-transitory computer-readable medium of claim 21, wherein the second time frame is before the first time frame.

30. The non-transitory computer-readable medium of claim 21, wherein the instructions further cause the one or more processors to determine whether to skip processing of the first audio frame by a machine learning model based on the comparison.

\* \* \* \* \*